May 26, 1953  A. L. HOLCOMB  2,639,965
RECORDING SYSTEM
Filed March 11, 1952  2 Sheets-Sheet 1
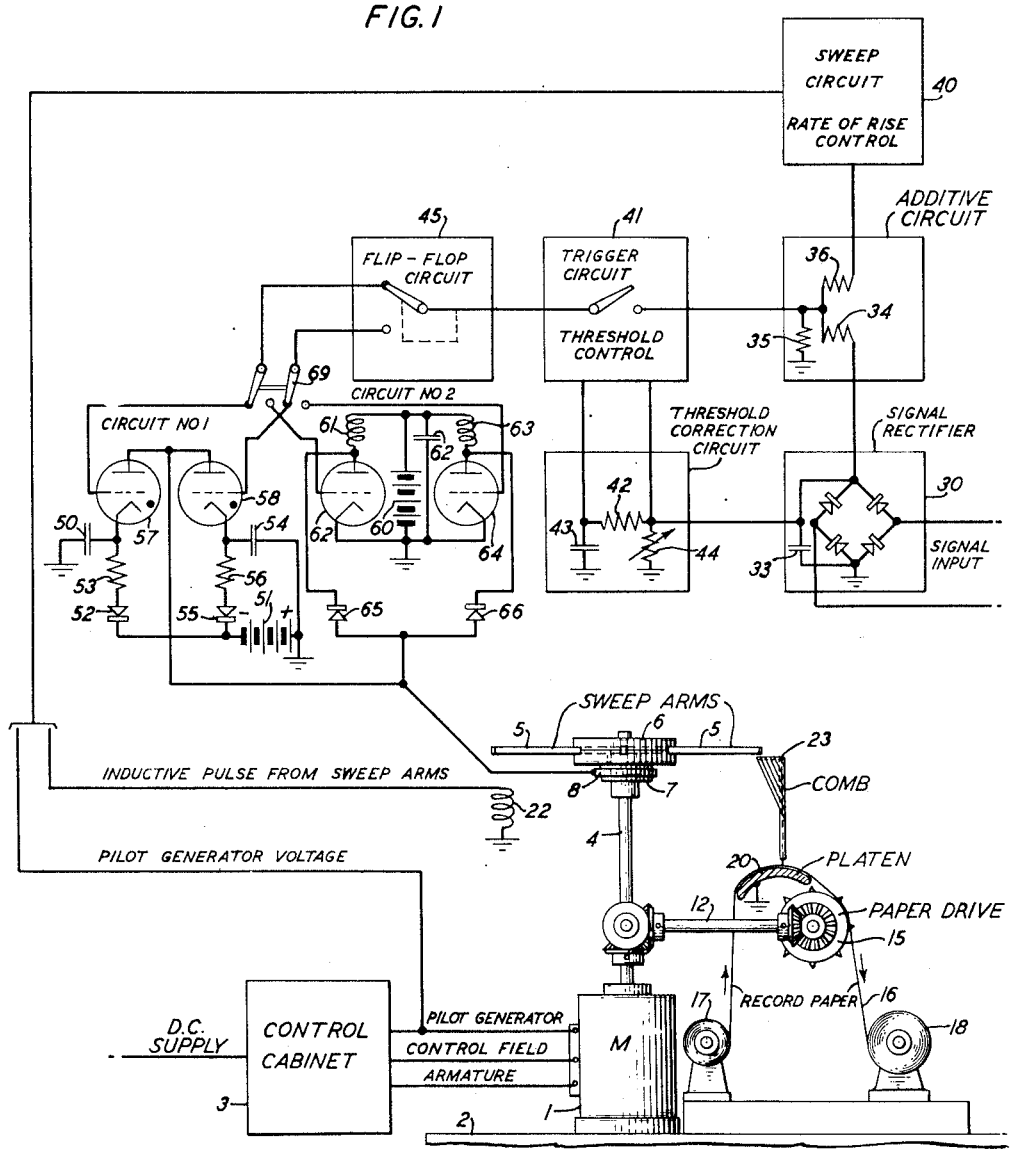
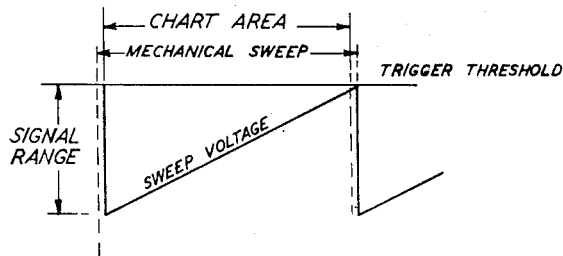
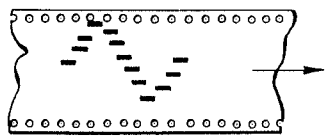
INVENTOR
A.L. HOLCOMB
BY
ATTORNEY May 26, 1953  A. L. HOLCOMB  2,639,965
RECORDING SYSTEM Filed March 11, 1952  2 Sheets-Sheet 2

INVENTOR
A.L. HOLCOMB
BY
ATTORNEY

Patented May 26, 1953

2,639,965

UNITED STATES PATENT OFFICE 2,639,965

RECORDING SYSTEM

Arthur L. Holcomb, Tarzana, Calif., assignor to Western Electric Company, Incorporated, New York, N. Y., a corporation of New York Application March 11, 1952, Serial No. 275,951

7 Claims. (Cl. 346—33)

This invention relates to high speed chart recorders, and particularly to recorders using an impulsive, or spark, discharge.

The object of the invention is apparatus for recording at high speed by means of an impulsive, or spark discharge, the successive magnitudes of an electrical signal.

A feature of the invention is the association, with a multiplicity of conductors in constant contact with the recording surface, of rotary distributor arms to direct the impulsive electrical discharge to the recording surface.

Another feature of the invention is the generation of a saw-tooth voltage wave synchronized with the motion of the rotary distributor arms, which is combined with the signal voltage, so that, at some time during the travel of a distributor arm across the multiplicity of conductors, the combined saw-tooth and signal voltages will exceed a threshold value.

A further feature of the invention is an electrical trigger circuit, energized when the combined voltages exceed the threshold value, to release sufficient stored electrical energy to bridge the short gap between the distributor arm and the nearest conductor and thus to supply sufficient current to mark the recording surface.

The recording surface is preferably a known type of electrosensitive chart paper which is discolored by the passage of an electrical current therethrough and forms a permanent record without further processing, though other types of electrosensitive materials may be used.

In the operation of this recorder, electrical pulses of steep wave front are recurrently generated in synchronism with the mechanical position of a constantly rotating shaft. These pulses initiate the generation of sweep voltages, which rise at a uniform rate, and, through predetermined arcs of rotation of the shaft, are proportional in amplitude to the position of the shaft. These recurrent sweep voltages are superposed on the signal voltage to be recorded, and the combined voltage supplied to a trigger circuit having a well defined threshold voltage. When the combined voltages exceed the threshold voltage, the trigger circuit is energized to control the generation of an electrical impulse of short duration. An arm, driven by the shaft and synchronized in position in relation to the initiating pulses, sweeps at uniform speed past the ends of a line of conductors located near the chart. The distance moved by the arm along the line of conductors is proportional to the amplitude of the sweep voltage. The impulsive discharge produces a spark between the arm and the end of the nearest conductor, causing a current to flow in the conductor and mark the record, thus, the distance traveled by the arm over the ends of the conductors between the initiating pulse and the discharge is proportional to the amplitude of the signal voltage.

In the drawings:

Fig. 1 shows, in partial block schematic, a typical embodiment of the invention;

Fig. 4 depicts the type of record made by the recorder, distorted in scale to show the marks; and Figs. 5 and 6 are plots of the voltage waves used to produce the record.

Figure 2:
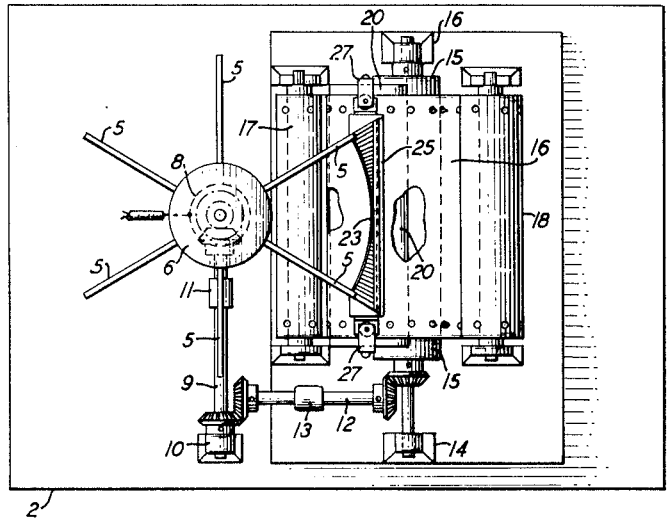
Fig. 2 shows a top view of the motor driven recorder.
Figure 3:
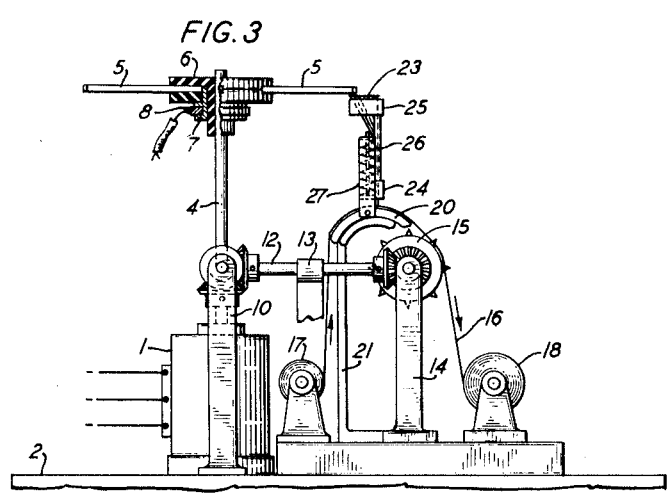
Fig. 3 shows a side view in part section, of the motor driven recorder.

The motor 1, mounted on any suitable base 2, should be a constant speed motor, and may conveniently be of the type described in my article "Precision Speed Control" published in the Journal of the Society of Motion Picture Engineers, volume 52, May 1949. The associated control circuit is mounted in the control cabinet 3. An insulating support 6 is mounted on the shaft 4 to retain the distributor, or sweep arms 5, 5. If desired, suitable gearing, not shown, may be interposed between the motor shaft and shaft 4. With direct drive and a motor speed of 10,000 revolutions per minute, six distributor arms 5, 5 equally spaced at 60-degree intervals may be used, and each arm 5 will then sweep over an arc of 60 degrees in 1 millisecond. A conductive sleeve 7, insulated from shaft 4, contacts all of the arms 5, 5. A slip ring, or other suitable contactor, connects the sleeve 7 to the recording circuit.

The shaft 9, journalled in the supports 10, 11, is geared to the shaft 4, and drives shaft 12, journalled in support 13. The chart paper 16 is led over a smooth conductive platen 20, supported by a suitable bracket 21, to the take-up reel 18. The chart paper 16 is advanced in synchronism with the movements of the arms 5, 5 by the sprocket 15, geared to the shaft 12, and journalled in supports 14, 16. The take-up reel 18 may be driven in any desired manner. While one operative embodiment of the invention has been disclosed, it is evident that many changes in mechanical details may be made within the scope of the appended claims.

Associated with the motor described in my above-mentioned article is a pilot generator of the inductor type, which is used to sense changes in the motor speed and to activate the control circuit to correct any tendency of the motor speed to change from the assigned speed. The number of distributor, or sweep arms 5, 5 may be made the same as the number of poles on the pilot generator, so that the phase relation of the amplitude of the generated voltage to any point on the active arc of rotation of the arms 5, 5 will be constant. At a speed of 10,000 revolutions per minute, a six-pole inductor generator will deliver an essentially square wave having a repetition frequency of 1,000 cycles per second, and each arm will sweep over a 60-degree arc in one cycle of the generator voltage. The length of the sweep arms is selected so that the desired chart width is approximately equal to the chord of a 60-degree arc near the tips of the arms, thus, each arm will sweep across the chosen chart width in one millisecond, and the beginning of the sweep over the chart width may be made to coincide with any desired point on the generated voltage wave. The pilot generator voltage thus may be used to initiate or terminate an electronic action which is a direct function of the sweep arm position with respect to the recorder.

When using other types of constant speed motors not equipped with pilot generators, an inductor coil 22 may be located so as to be influenced by the arms 5, 5 to produce an inductive pulse with the passage of each arm.

The marking of the electrosensitive chart paper 16 is controlled by a large number of electrical conductors, insulated from each other and mounted with one end in contact with the paper, the other end of these conductors receiving electrical impulses from the arms 5, 5, which pass through the conductors and paper to the platen 20. As shown in Fig. 4, the paper 16 is thus marked in steps which are a function of the number and size of the conductors. Using a four-inch width of record, for an accuracy of one-quarter per cent, the steps between marks must not be more than .010 inch, and, as conduction may occur in two adjacent conductors, the maximum diameter of a conductor with insulation must not be more than .005 inch, which is 200 conductors per inch, or 800 conductors for a four-inch record.

As one end of these conductors is in contact with the paper and may be subject to some abrasion, the conductors may be made of some substance which resists abrasion, such as one of the well-known alloys of nickel and iron.

A nickel-iron wire insulated with a heat resistant, insulating enamel, such as an enamel containing silicone, is closely wound in a helix over a layer of glass cloth covering a smooth cylinder. When the length of the helix equals the width of the desired record, the wire is tied down, dipped in a heat resistant, thermosetting varnish, such as a silicone varnish, and lightly baked. This dipping and baking is repeated until the wires are well bonded to the glass cloth and to each other. An outer layer of glass cloth is then wound over the assembly, with the joint of the outer layer of glass cloth coinciding with the joint of the inner layer, and the dipping in enamel and baking repeated until a satisfactory assembly is produced. The coil is then slit lengthwise at the joints in the glass cloth, peeled off the cylinder, and cut into proper lengths.

The lower end of an assembly of conductors, or comb, 23 is clamped or molded in an insulating clamp 24, made of some good insulating material which is dimensionally stable and mechanically rugged. The upper end of the comb 23 is similarly clamped in a clamp 25, made of similar material and shaped to the contour of the movement of the arms 5, 5. The clamps 24, 25, may then be ground accurately to the desired shape. A support 26 unites the clamps 24, 25 and may be designed to allow sufficient slack in the comb 23 to permit independent adjustment of either of the clamps 24, 25. The complete assembly is supported by a bracket 27, secured to the platen 20, or support 21, and attached to the clamp 24. If desired, a spring may be embodied in the bracket 27 to press the clamp 24 against the paper 16.

If each of the arms 5 sweep across the comb 23 in one millisecond, signals varying in amplitude at rates up to 100 cycles per second may be accurately recorded. Unidirectional signals may be supplied directly to the recording circuit, but modulated high frequencies must be rectified to produce a voltage varying with the amplitude of the envelope of the modulated currents. The modulated signal waves may be supplied to a signal rectifier network 30, the rectified pulsating current flowing to ground through resistors 34, 35. A capacitor 33 smooths the rectified current.

The pilot generator voltage, or the voltage induced in the inductive coil 22, is supplied to a sweep circuit 40, of known type, to initiate a flow of current through resistors 36, 35.

Figure 6:
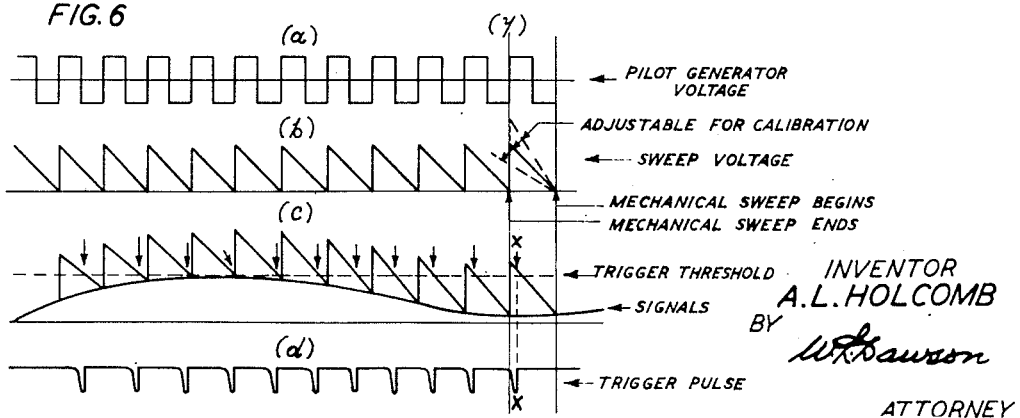

The pilot generator voltage wave is shown in Fig. 6a, and the sweep voltage wave in Fig. 6b. The sweep voltage rises until the sudden change toward negative in the pilot voltage, as at y, terminates the rise of the sweep voltage and reduces this voltage to zero. When the pilot voltage ceases changing at a rapid rate in the negative direction, the sweep voltage again rises. The current from the sweep circuit 40, flowing in resistor 35 combines with the rectified signal current flowing in this resistor to produce a combined voltage across resistor 35 as shown in Fig. 6c.

The simple additive circuit formed of resistors 34, 35, 36, may if desired, be replaced by a summing amplifier, such as the amplifier shown in United States Patent 2,401,779, June 11, 1946, K. D. Swartzel, Jr.

The summation voltage developed across resistor 35 is supplied to a known trigger circuit 41, having a threshold control adjusted so that the circuit will not operate until the applied voltage exceeds the threshold value.

The addition of the signal voltage to the sweep voltage produces a slight distortion of the shape of the sweep voltage wave, so that, when the signal voltage is rising, the combined wave shape tends to be concave downward, and when the signal voltage is falling, the combined wave shape tends to be convex upward. This distortion may alter the point at which the amplitude of the combined wave exceeds the threshold voltage of the trigger circuit, and may produce an error in the record. This error will be proportional to the rate of change of the signal voltage, and may cause late triggering on an increasing signal, and early triggering on a decreasing signal.

The voltage across the combination of a resistor in series with a capacitor is proportional to the rate of charge or discharge of the capacitor; and changes in polarity with the charge or discharge, thus, such a circuit may be used to correct the error in response of the trigger circuit.

A portion of the rectified signal voltage is supplied to the serial combination of resistor 42 and capacitor 43, and the voltage drop developed across resistor 42 is applied as a correction voltage to the threshold control element of the trigger circuit 41. A resistor 44, or other attenuating means may be shunted across this threshold correction circuit to vary the amplitude of the corrective voltage.

The trigger circuit produces a series of pulses, as shown in Fig. 6d. These pulses trigger the bistable, or flip-flop, circuit 45, which in turn triggers alternate sections of the reactive storage and discharge circuits No. 1 or No. 2. Alternate functioning of the two similar sections is desirable in order to permit a relatively long charging time for each section.

In the reactive discharge circuit shown in circuit No. 1 of Fig. 1 capacitor 50 is charged from source 51 through rectifier 52 and resistor 53; and capacitor 54 is similarly charged through rectifier 55, and resistor 56. The grids of the grid controlled gas-filled tubes 57, 58 are normally biased beyond cut-off, but when circuit 45 is first actuated, a positive pulse is applied to the grid of tube 57, breaking down this tube and permitting capacitor 50 to discharge through ground, platen 20, paper 16, comb 23, arm 5, slip ring 8 and the anode-cathode path of the tube 57. Similarly, when circuit 45 is restored, capacitor 54 discharges through ground, platen 20, paper 16, arm 5, slip ring 8 and tube 58. The successive discharges produce small areas of discoloration in the paper 16 corresponding to the conductors in the comb 23 which are aligned with the arm 5 at the instant of discharge.

The discharge may also, if desired, be produced by inductive means as in circuit No. 2. Current from battery 60 flows through coil 61 and tube 62; and through coil 63 and tube 64. Tubes 62, 64, are vacuum tubes biased to full conductivity. When circuit 45 is first actuated, a negative pulse is applied to the control grid of tube 62, cutting off this tube. The magnetic field of coil 61 collapses, causing a current to flow through capacitor 62, ground, platen 20, paper 16, comb 23, arm 5, ring 8, rectifier 65. Similarly, when circuit 45 is restored, tube 64 is cut off and coil 63 causes a current to flow through capacitor 62, ground, platen 20, paper 16, comb 23, arm 5, ring 8, rectifier 66.

Switch 69 may be moved to select the type of discharge desired. Typical sweep, trigger, and bistable circuits are described in the book Waveforms, volume 19 of Radiation Laboratory Series, published by McGraw-Hill Book Company, New York; and in the book, Time Bases, O. S. Puckle, published by John Wiley and Sons, Inc., New York.

The sweep arms 5 are shaped to form knife edge electrodes, or are equipped with replaceable knife edge electrodes, which clear the comb 23 by a few millinches. The impulsive discharge supplied to the arms 5 will break down this air gap to mark the record paper, and may also gradually burn away the sharp edge of the electrode. With a knife edge electrode, the active area may easily be renewed by a small axial adjustment of the knife edges along the arms 5.

If desired, the upper portion of the comb 23 may be shaped to produce other than a linear relationship between the sweeps of arms 5 and the record on paper 16. Logarithmic, exponential, sine, cosine, or other relationships may thus be produced.

By well-known means, the motor frame may be arranged for rotation through a small angle to accurately locate the arms 5 with respect to the synchronizing wave from the pilot generator; and means may be provided to adjust the comb 23 with respect to the arms 5 to make the sweep width correspond with the chart width.

Calibration

With the unit operating, a measured direct voltage, having an amplitude equal to or greater than the maximum signal amplitude to be recorded, is applied to the signal input, and the threshold voltage adjusted until, as shown in Fig. 5, a mark is made at the left edge of the chart where the sweep voltage is zero. This direct voltage is then removed, the signal input left open, or short-circuited, to provide zero signal voltage, and the rate of rise of the sweep voltage adjusted until the chart is marked on the zero ordinate at the right edge of the chart.

To check the design or adjustment of the threshold correction circuit, a sinusoidal wave of 125 cycles may be applied to the signal input. The arms 5 will make four complete sweeps over the comb 23 during one-half cycle of this wave, and the relative phase of this wave and the motion of the arms may be adjusted so that five marks are produced on the record for each half cycle, two marks at zero at the beginning and end of the half cycle, one at the maximum amplitude of the wave, and two at intermediate values. The intermediate values will respectively be on the rising portion of the wave, and on the falling portion of the wave, and should be equidistant between the maximum and a zero. The correction circuit may be modified or adjusted to produce this result.

What is claimed is:

1. In a recorder having a framework supporting a chemically prepared recording surface, a plurality of insulated conductors supported by said framework in alignment across the width of the recording surface adjacent to said surface, the free ends of said conductors being arcuately shaped, a rotatable distributor having a plurality of radially projecting conductive arms adjacent to the arcuate surface, the circumferential spacing of said arms being equal to the arcuate width of said conductors, motor means mounted on said framework driving said distributor, said means controlling the generation of an alternating pilot wave, a sweep circuit controlled by said wave to supply a continuously varying voltage to said distributor during the sweep of an arm across the conductors, and means connected to said distributor and controlled by the signal to be recorded to supply a succession of impulsive discharges to the distributor during the duration of the signal.

2. Recording apparatus including a framework supporting an electrosensitive recording surface, a plurality of insulated conductors supported by said framework in alignment across the width of said surface, each conductor having one end adjacent to said surface, a rotatable distributor having a plurality of radially projecting conductive arms sweeping over the free ends of said conductors, a motor mounted on said framework and driving said distributor at constant speed, a generator of recurrent voltage waves controlled by said motor to linearly vary during the sweep of an arm over said conductors, summing means for combining said recurrent waves with the signal voltage wave to be recorded, and impulse generating means connected to said arms and energized when said combined waves exceed a predetermined value to discharge a current through one of said arms, the adjacent conductor, and the recording surface.

3. The combination in claim 2 with means driven by said motor to advance the recording surface at constant speed.

4. The combination in claim 2 in which the free ends of said conductors are disposed on an arc of a circle concentric with the center of rotation of said arms.

5. The combination in claim 2 in which the arms are formed as knife edges facing said conductors.

6. The combination in claim 2 in which a generator driven by the motor controls the generator of recurrent waves.

7. Recording apparatus including a framework supporting an electrosensitive recording surface, a plurality of insulated conductors supported by said framework in alignment across the width of said surface, each conductor having one end adjacent to said surface, a rotatable distributor having a plurality of radially projecting conductive arms sweeping over the free ends of said conductors, a motor mounted on said framework and driving said distributor and said surface at constant speeds, a generator driven by said motor to produce an electrical pulse at the beginning of each sweep of an arm across said conductors, a sweep circuit controlled by said pulses to produce a voltage linearly rising at constant rate during the sweep of an arm, summing means connected to said sweep circuit for combining said sweep voltage with the voltage to be recorded, a trigger circuit connected to said summing means and energized when said combined voltages exceed a predetermined value, and an impulse generator connected from said trigger circuit to said arms and activated by the energization of said trigger circuit to discharge an electrical impulse through one of said arms, the adjacent conductor and the recording surface.

ARTHUR L. HOLCOMB.

No references cited.